United States Patent [19]
Nishi et al.

[11] Patent Number: 5,373,821
[45] Date of Patent: * Dec. 20, 1994

[54] ENGINE CONTROL SYSTEM FOR INTERNAL COMBUSTION ENGINE

[75] Inventors: Hideyuki Nishi, Higashihiroshima; Tetsuji Nagata; Hiromi Ono, both of Hiroshima, all of Japan

[73] Assignee: Mazda Motor Corporation, Hiroshima, Japan

[*] Notice: The portion of the term of this patent subsequent to Jun. 20, 2010 has been disclaimed.

[21] Appl. No.: 821,925

[22] Filed: Jan. 16, 1992

[30] Foreign Application Priority Data

Jan. 16, 1991 [JP] Japan .................................. 3-102127

[51] Int. Cl.$^5$ .................................................. F02M 3/00
[52] U.S. Cl. .................................................. 123/339
[58] Field of Search ............... 123/339, 585, 586, 422; 364/431.07

[56] References Cited

U.S. PATENT DOCUMENTS

| | | | |
|---|---|---|---|
| 4,716,871 | 1/1988 | Sakamoto et al. | 123/339 |
| 4,732,125 | 3/1988 | Takizawa | 123/422 |
| 4,819,596 | 4/1989 | Naruoka et al. | 123/339 |
| 4,841,447 | 6/1989 | Hayashi et al. | 364/431.07 |
| 4,879,982 | 11/1989 | Itakura et al. | 123/339 |
| 4,903,660 | 2/1990 | Sogawa | 123/339 |
| 5,035,215 | 7/1991 | Ohuchi | 123/339 |
| 5,056,483 | 10/1991 | Ohuchi | 123/339 |

FOREIGN PATENT DOCUMENTS 62-58053  3/1987  Japan .................................. 123/339

*Primary Examiner*—Raymond A. Nelli
*Attorney, Agent, or Firm*—Keck, Mahin & Cate

[57] ABSTRACT

An internal combustion engine control system retards a fuel ignition time based on a deviation in the intake air quantity from a predetermined target intake air quantity which is necessary to keep an internal combustion engine idling at a predetermined idle speed. The fuel ignition time is retarded when a transmission is shifted into a neutral range so as to cause a quantity of intake air to converge with the predetermined target quantity of intake air. An engine speed of the internal combustion engine thereby converges with the predetermined idle speed.

14 Claims, 5 Drawing Sheets

ENGINE CONTROL SYSTEM FOR INTERNAL COMBUSTION ENGINE

BACKGROUND OF THE INVENTION

1. Field of the Invention

The present invention relates to a control system for an internal combustion engine and, more particularly, to an engine control system which controls a rapid increase in engine speed when a transmission is shifted into a neutral range from in-gear ranges. Typically, an engine ignition timing is set so as to enable an engine to provide a desired output according to the amount of intake air. However, when a throttle valve, used to control the amount of intake air, is closed while a transmission clutch is disengaged, the engine may experience an abrupt rise in rotational engine speed. This is because an engine of the type having a fuel injection system is typically provided with a surge tank having an increased volume and located downstream of the throttle valve. An engine of this type will be supplied with air from the surge tank having the increased volume for a certain time period after closing the throttle. This allows an air-fuel mixture to continue to burn for the certain time period.

2. Description of Related Art

In order to prevent such an abrupt speed increase, it was thought that an ignition time, at which fuel ignition is produced, should be delayed or retarded so as to drop the engine speed. However, because any abrupt speed increase varies, depending upon the engine properties, and because the degree of abrupt speed increase changes due to the effects of aging, it is hard to definitely establish an ignition timing retardation for various types of engines. If, as is preferable, an ignition timing retardation is set so as to be suitably large for a relatively new engine, which has a burning performance which has not been seriously degraded due to aging, the same engine, if its burning performance does eventually become degraded due to aging, will be overcontrolled. This is due to the fact that a smaller abrupt speed increase will occur as the engine ages. Overcontrol of the engine in this manner can cause the rotational speed to fall low enough so that the engine stalls. If, however, an ignition timing retardation is made suitably small for an engine which has a burning performance which has been degraded due to aging, while the engine does not in fact suffer from a burning performance which has been degraded due to aging, it is difficult for the engine to control an abrupt increase in engine rotational speed in a satisfactory manner.

An engine control system, such as that which is known from, for instance, Japanese Unexamined Patent Publication No. 62-58,053, conventionally delays or retards an ignition time at which fuel ignition is made during a transmission shift. The engine control system of the above-mentioned publication is designed to regularly delay or retard an ignition time for the engine, which is equipped with an automatic transmission, so as to avoid shift shocks. Consequently, this engine control system is unable to control an abrupt increase in engine rotational speed when the transmission is shifted into a neutral range from in-gear ranges.

SUMMARY OF THE INVENTION

It is a primary object of the present invention to provide an engine control system which controls an engine so that an abrupt rise in engine rotational speed is prevented, without having the engine stall, when a transmission is shifted into a neutral range from an ingear range.

It is another object of the present invention to provide an engine control system which gradually retards an ignition time as a transmission is shifted into a neutral range so as to prevent torque shocks which may be caused due to slipping of a clutch.

According to one aspect of the present invention, an engine control system for an internal combustion engine with a transmission has a control means for retarding a fuel ignition time based at least on a deviation of a quantity of intake air from a predetermined target quantity of intake air necessary to hold an internal combustion engine idling at a predetermined idle speed. Retardation of the fuel injection time is performed when the transmission is shifted into a neutral range from in-gear ranges so as to cause a quantity of intake air to converge with the predetermined target quantity of intake air, thereby causing the engine speed of the internal combustion engine the converge with the predetermined idle speed. An ignition time is gradually retarded, as time passes during a shift of the transmission, so as to prevent torque shocks which may be caused during what is referred to as "halfclutching," in which some clutch slippage occurs.

According to another aspect of the present invention, an engine control system for an internal combustion engine with a transmission has a control means for calculating a deviation of an engine speed from a predetermined idle speed at which the internal combustion engine is held during idling. The control means performs an ignition time retarding feedback control for retarding an ignition time, at which fuel ignition is made, based at least on the deviation of an engine speed when a shift detecting means detects a shift of the transmission into a neutral range so as to cause an engine speed of the internal combustion engine to approach or converge with the predetermined idle speed. The control means additionally holds the ignition time retarding feedback control for a predetermined period of time when an engine speed is higher than a predetermined feedback control speed. The ignition time retarding feedback control is based further on a deviation of a quantity of intake air from a predetermined target quantity of intake air necessary to keep the internal combustion engine idling at the predetermined idle speed.

An engine control system, thus constructed, will control the engine so that an abrupt increase in engine speed, during a shift of the transmission into neutral, is avoided without causing engine failure. Such a control is performed independently of variations in engine properties or changes in the degree of abrupt speed increases due to aging of the engine.

BRIEF DESCRIPTION OF THE DRAWINGS

The above and other objects and features of the present invention will be apparent to those skilled in the art from the following description of preferred embodiments thereof when considered in conjunction with the accompanying drawings, in which.

DETAILED DESCRIPTION OF THE PREFERRED EMBODIMENTS

Figure 1:
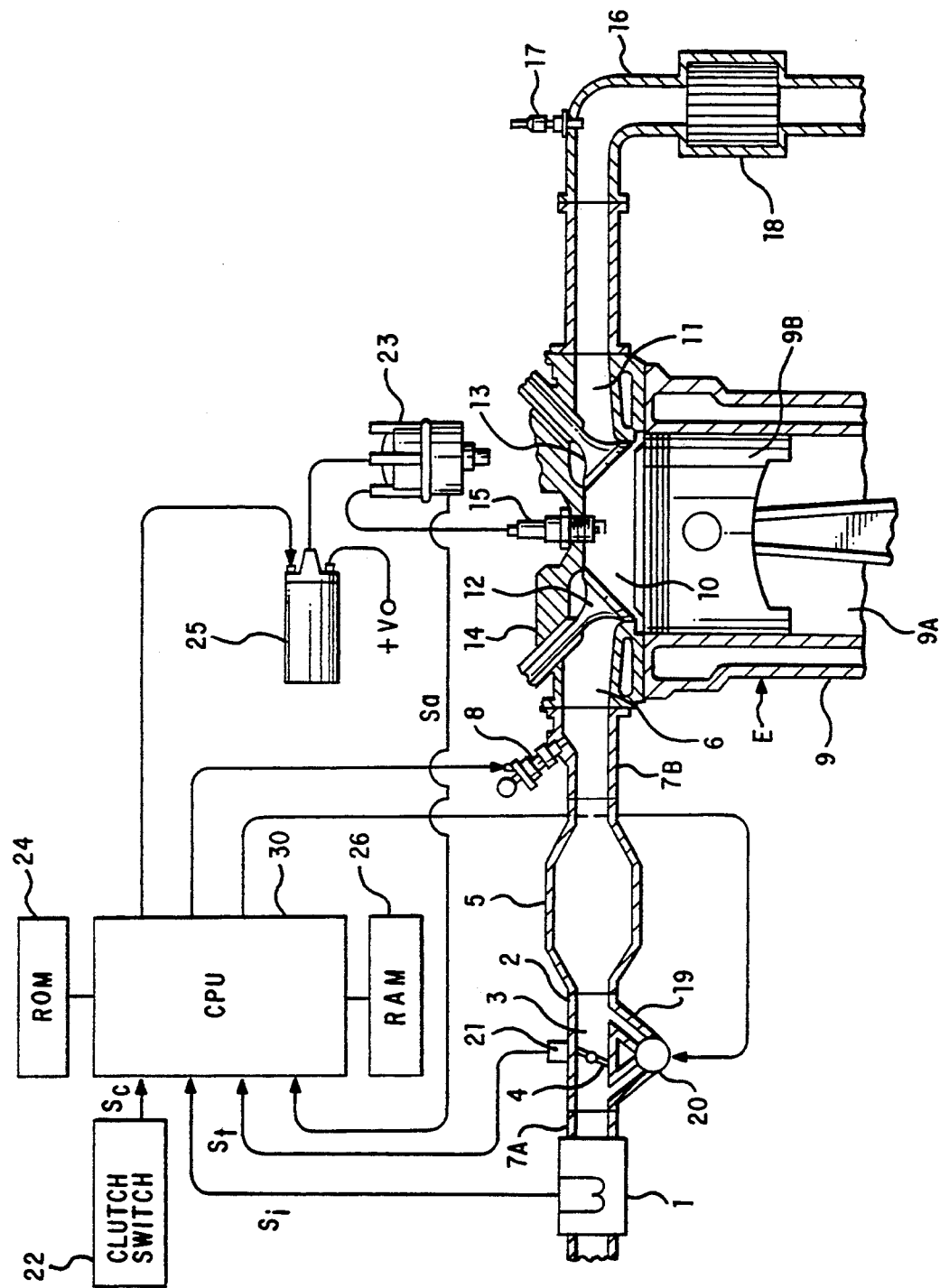
FIG. 1 is a schematic illustration of an internal combustion engine with an engine control system in accordance with a preferred embodiment of the present invention.

Referring to the drawings in detail and, in particular, to FIG. 1, an internal combustion engine E is shown. The engine E is provided with a fuel injection system, controlled by an engine control system in accordance with a preferred embodiment of the present invention. The engine E includes a cylinder block 9, provided with a plurality of cylinder bores 9A (only one of which is shown), in which pistons 9B (only one of which is shown) can slide, and a cylinder head 14. A combustion chamber 10 is formed in each cylinder by the top of the piston 9B, a lower wall of the cylinder head 14 and the cylinder bore 9A. The cylinder is provided with an intake port 6 and an exhaust port 11, opening into the combustion chamber 10. The intake and exhaust ports 6 and 11 are opened and shut at a predetermined timing by intake and exhaust valves 12 and 13, respectively. Each pair of intake and exhaust valves is driven by a valve drive mechanism (not shown) in a well known manner.

Intake air is introduced into the cylinder through an intake passage 7A formed, at its downstream end, with a surge tank 5 which has an enlarged cross section, larger than the remaining portion of the intake passage, so as to have a predetermined volume. An intake manifold 7B communicates the surge tank 5 with the intake port 6 of each cylinder. The intake passage 7A is provided, in order from the upstream side thereof, with an air cleaner (not shown), an air flow sensor 1, which may be what is known as a "hot wire" type of sensor, a throttle body 2 and a fuel injection nozzle 8, all of which are well known in structure and operation. The throttle body 2 has a throttle chamber 3 formed therein, in which a throttle valve 4 is installed. The throttle body is formed with a bypass passage 19 an idle speed control (ISC) valve 20. The idle speed control (ISC) valve 20 allows intake air to bypass the throttle valve 4. Positions at which the throttle valve 4 operates are detected by a throttle sensor 21. The intake manifold 7B is provided with a fuel injection nozzle 8, positioned immediately in front of the intake port 6, for each cylinder.

Burned gases are exhausted from the engine E through an exhaust passage 16 connected to the exhaust port 11. The exhaust passage 16 is provided with an emission gas sensor, such as an oxygen sensor 17, and a catalytic converter 18, both of which are well known in structure and operation.

A spark plug 14 is installed in the cylinder head 14 so that a center electrode and a side electrode, forming a small gap therebetween, extend into the combustion chamber 10 just the right amount. A distributor 23, having a distributor cap with its center terminal connected to an ignition coil 25, distributes high voltage to the spark plug 15 at correct times. Associated with the engine E is a transmission clutch sensor 22 and an engine speed sensor 27 for detecting disengagement of a transmission clutch (not shown) and an engine speed, respectively.

The engine E, thus constructed, is controlled by a control unit 30, including a microcomputer, which receives various signals, such as a clutch signal Sc indicating that the transmission clutch is engaged so as to place a manual transmission in any one of the several forward gear positions and a reverse gear position. Other signals received by the microcomputer include an intake air signal Si, indicating the amount of intake air introduced into the intake passage 7A, a throttle signal St, indicating the opening (TVO) or operated position of the throttle valve 4, and an angular velocity signal Sa, indicating a speed of rotation of a rotor of the distributor 23, which is representative of an engine speed Ne of the engine E. The control unit 30 has a ROM 24, which carries a programmed control sequence of the operation of the engine E, and a RAM 26, which carries control maps, such as a basic ignition timing map (not shown), on which basic ignition timing IgB is defined according to engine speed Ne and intake air charging efficiency Ce, and an ignition timing retard map, on which an ignition timing retard IgR is defined according to an intake air charging efficiency deviation dCe.

Figure 2:
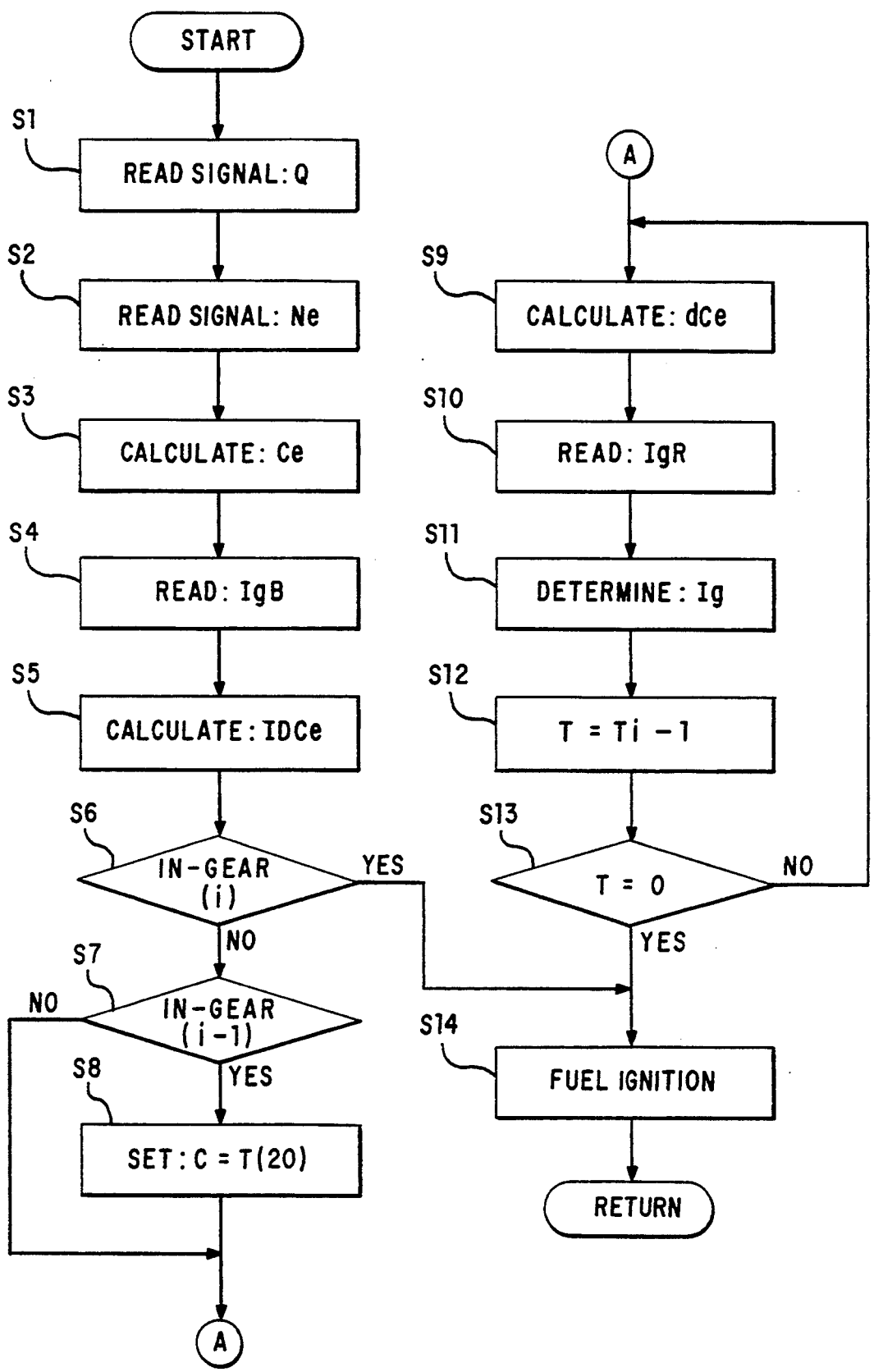
FIG. 2 is a flow chart illustrating an ignition timing control sequence for a microcomputer.

The operation of the engine E shown in FIG. 1 is best understood by referring to FIG. 2, which is a flow chart illustrating an ignition timing retard control sequence for the microcomputer of the control unit 30. Programming a computer is a skill well understood in the art. The following description is written to enable a programmer having ordinary skill in the art to prepare an appropriate program for the microcomputer. The particular details of any such program would, of course, depend on the architecture of the particular computer selected.

The first operation, represented by step S1 in FIG. 2, is to detect the amount of intake air Q introduced in the intake passage 7A, based on an intake air signal Si from the air flow sensor 1. In step S2, an engine speed Ne of the engine E is detected, based on an angular velocity signal Sa from the distributor 23. After detecting the amount of intake air Q and the engine speed Ne, in step S3, an air charging efficiency Ce is calculated from the following equation:

$$Ce = Q/Ne$$

Then, in step S4, a basic ignition timing IgB is read out from the basic ignition timing map according to the air charging efficiency Ce and the engine speed Ne.

In step S5, a target idling intake air charging efficiency IDCe, which is necessary to keep the engine idling at a desired idling speed of, for instance, approximately 800 rpm, is calculated in a well known manner. Calculation of the target idling air charging efficiency IDCe is made by taking into consideration engine operating conditions, including the temperature of the engine, whether or not an air conditioner is being used, etc. Thereafter, a decision is made in step S6, based on a clutch engagement signal Sc from the clutch sensor 22 as to whether or not the clutch is engaged. If in fact there is a clutch engagement signal Sc, this indicates that the clutch is engaged so as to place the manual transmission in any one of the forward and reverse gear positions. Then, in step S14, fuel ignition is made at a basic ignition time IgB determined in the manner described above in step S4. However, if there is no clutch engagement signal Sc, this indicates that the clutch is disengaged, or in a neutral position, and holds the transmission in neutral. Then, another decision is made concerning an engagement of the clutch in the previous sequence.

In step S7, a decision is made as to whether or not the clutch was engaged in the previous sequence. If the answer to this decision is yes, this indicates that the manual transmission has been shifted into a neutral range from one of the in-gear ranges; such in-gear ranges include the forward and reverse gears. On the other hand, if the answer to the decision made in step S7 is no, this indicates that the manual transmission is kept in neutral from the previous sequence. After initializing an ignition timing retard control counter in step S8 to a predetermined initial count T of, for instance, 20, if the answer to the decision made in step S7 is yes, or directly after step S7, if the answer to the decision made in step S7 is no, step S9 is performed. In step S9, an intake air charging efficiency deviation dCe, which is the difference between the actual air charging efficiency Ce and the target idling air charging efficiency IDCe for idling, is calculated. After reading out an ignition timing retard value IgR from the ignition timing retard map, according to the actual air charging efficiency deviation dCe, in step S10, an eventual ignition timing Ig is calculated by subtracting the ignition timing retard IgR from the basic ignition timing IgB, read in step S4, in step S11. Thereafter, after changing a present count C of the ignition timing retard control counter by a decrement of one in step S12, a decision is made in step S13 as to whether the predetermined initial count T has been counted down or the present count C is zero (0). The steps S9 to S13 are repeated as long as the answer to the decision in step S13 is no or until the predetermined initial count T is fully counted down to zero (0). When the predetermined initial count T is fully counted down to zero (0), then, in step S14, fuel ignition is made at the eventual ignition time Ig, determined in step S11, so as to cause the engine speed Ne and the desired idling engine speed N of the engine E to converge.

Figure 3:
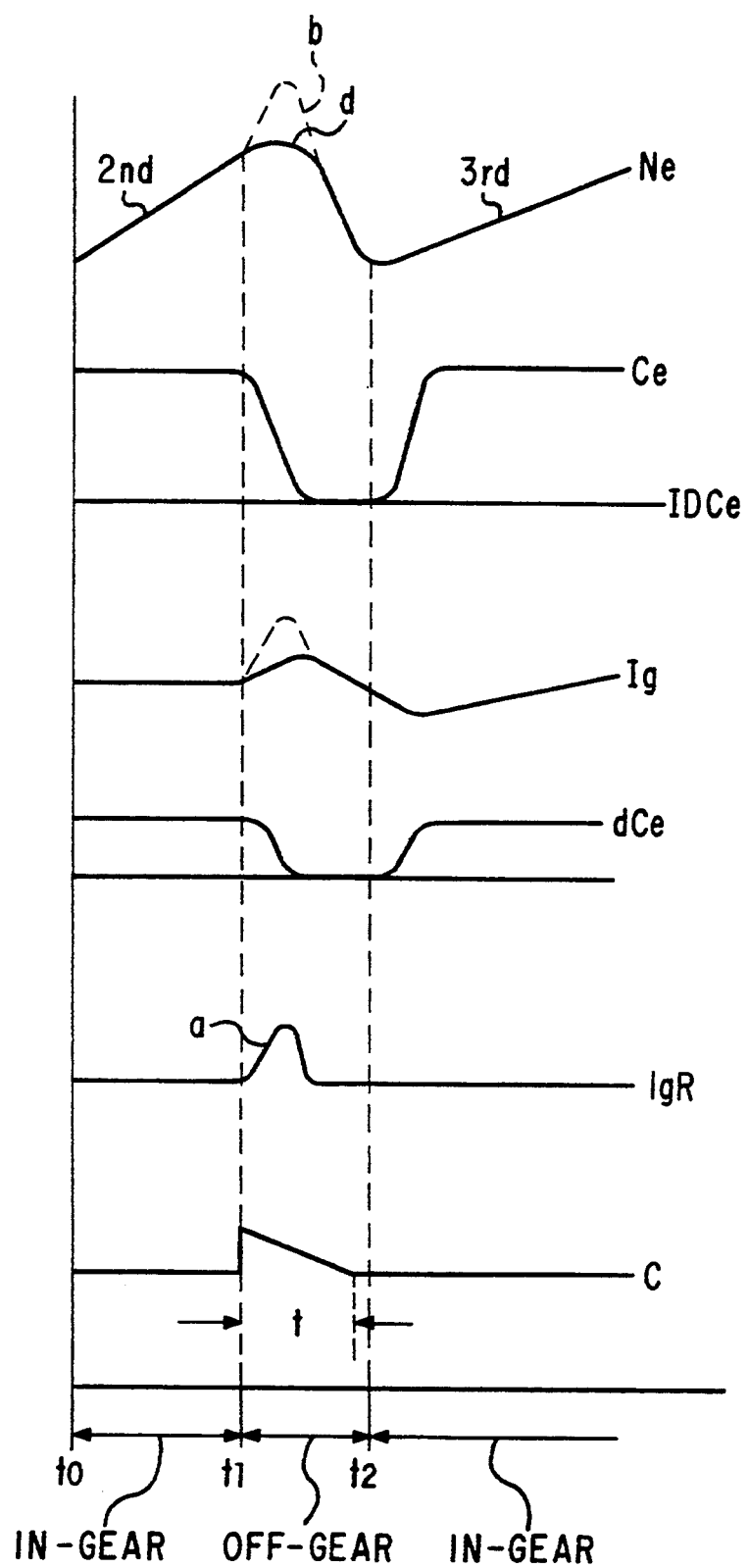
FIG. 3 is a time chart showing a retardation of ignition timing.

As an example, shifting of the manual transmission into neutral from second gear at a time t1 and then into a third gear from neutral at a time t2 is considered; such shifting is represented in FIG. 3. When a shift of the manual transmission from the second gear to neutral occurs at time t1, an ignition timing retard IgR is read from the map of a retard curve a, illustrated in FIG. 3, according to an air charging efficiency deviation dCe, which is obtained as a difference between an actual air charging efficiency Ce and a target idling air charging efficiency IDce. As is apparent from the retard curve a in FIG. 3, the ignition timing retard value IgR gradually increases with the passage of time so as to gradually delay a time at which an eventual fuel ignition is made. Such prevents the engine E from rapidly increasing its speed Ne, as is shown by a chained curve b, and allows the engine to change its speed Ne gently and smoothly, as is shown by a solid curve d.

According to the engine control system of the present invention, a retardation of the ignition timing is actually made according to an air charging efficiency deviation dCe, which is the difference between an actual air charging efficiency Ce and a target idling air charging efficiency IDCe. Consequently, the actual air charging efficiency Ce converges with the target idling air charging efficiency IDCe, so that an abrupt rise in engine rotational speed, due to a shift of the transmission, is properly avoided without causing the engine to stall. Abrupt increases in engine rotational speed are avoided despite both variations in the properties of engines and degradation of the burning performance of the engines due to aging. Furthermore, an ignition time is gradually retarded by increasingly controlling retardation of ignition timing when the clutch sensor 22 detects a disengagement of the clutch, which indicates a transition of the transmission into a neutral range. Therefore, torque shocks, which may be caused due to clutch slippage, are effectively prevented, independently of variations in clutch sensors.

Fuel ignition may alternatively be made at a time retarded in an ignition timing retarding feedback control for idling. A sequence for making such fuel ignition is represented by a flow chart shown in FIG. 4. In this ignition timing retarding feedback control, fuel ignition is made at a time which is retarded so as to cause an engine speed Ne to converge with a target idling engine speed N.

Figure 4:
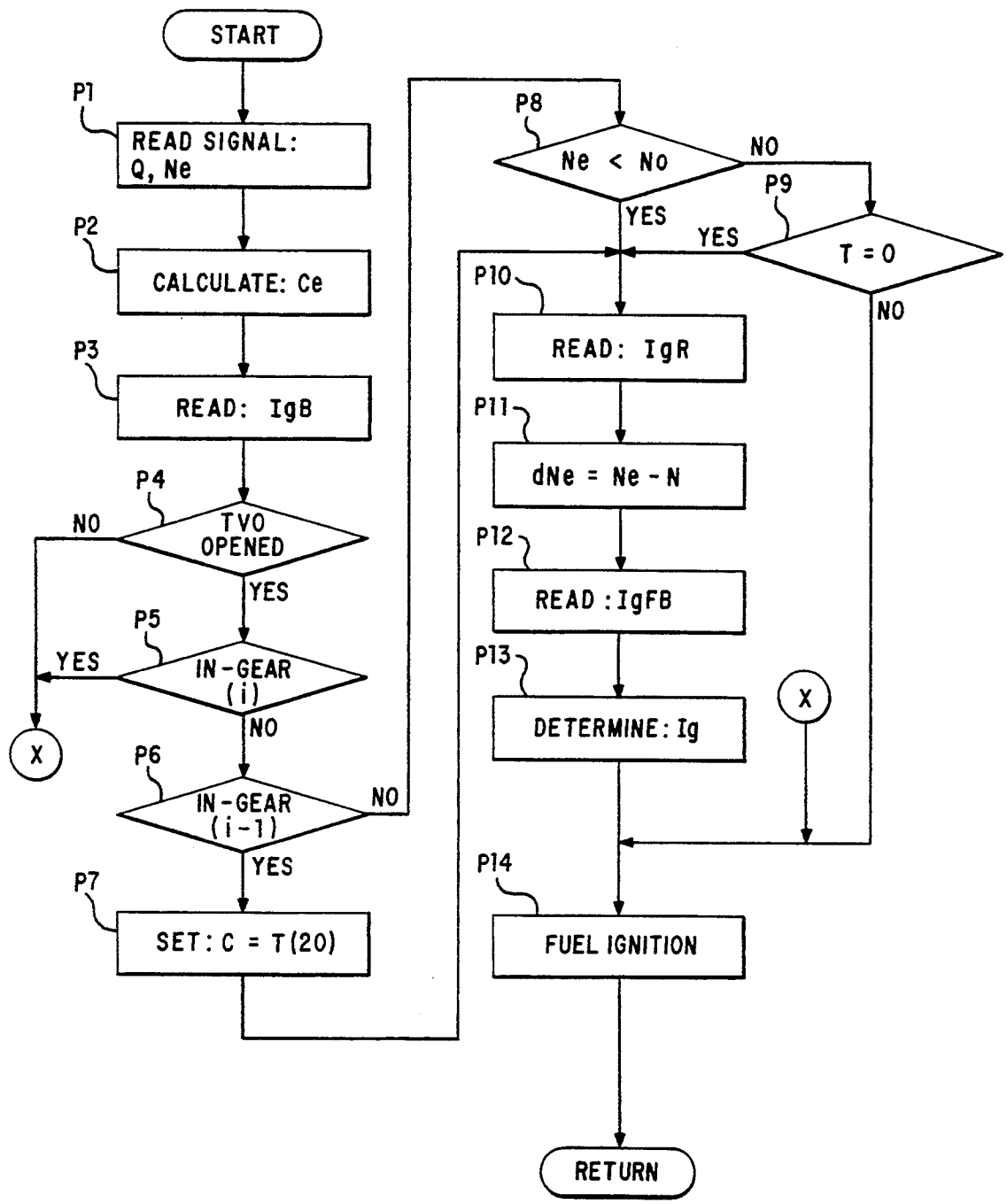
FIG. 4 a flow chart illustrating an ignition timing control sequence, for a microcomputer, of an engine control system in accordance with another preferred embodiment of the present invention.

Referring to FIG. 4 in conjunction with FIG. 1, in step P1, the amount of intake air Q introduced into the intake passage 7A and an engine speed Ne of the engine E, based on signals Si and Sa from the air flow sensor 1 and the distributor 23, respectively, are detected. Then, an air charging efficiency is calculated in step P2 by dividing the intake air amount Q by the engine speed Ne. In step P3, a basic ignition timing IgB is read out from the basic ignition timing map according to the air charging efficiency Ce.

In step P4, a decision is made, based on a signal St from the throttle sensor 21, as to whether or not the throttle valve 4 is fully closed. When the answer to the decision made in step P4 is no, this indicates that the throttle 4 is still open. Then, fuel ignition is simply made at the basic ignition timing IgB, read out in step P3, in step P14. Otherwise, if the answer to the decision made in step P4 is yes, this indicates that the throttle 4 is fully closed, and a decision is made in step P5, based on a clutch engagement signal Sc from the clutch sensor 22, as to whether the clutch is engaged in the current sequence. If in fact the clutch is actually engaged and places the transmission in an in-gear range, namely, any of the forward and reverse gear ranges, then, fuel ignition is made at the basic ignition timing IgB, read out in step P3, in step P14. After fuel ignition in step P14, a return is ordered so as to start another ignition timing retarding feedback control sequence. However, if the clutch is disengaged and the transmission is held in neutral, then, another decision is made concerning a state of the transmission in the previous sequence.

In step P6, a decision is made as to whether or not the clutch was engaged in the previous sequence. If the answer to the decision is yes, this indicates that the transmission has been shifted into the neutral range from one of the in-gear ranges. Then, an ignition timing retard control execution counter is initialized to a predetermined initial count T, for instance 20, in step P7. If the answer to the decision made in step P6 is no, this indicates that the transmission has been kept in neutral continuously since the previous sequence. Then, a decision is made in step P8, based on an angular velocity signal Sa from the distributor 23, as to whether or not a current engine speed Ne is smaller than a feedback idling engine speed No desired for feedback control. Such a feedback idling engine speed may be, for instance, approximately 1200 rpm if a desired idling engine speed N, at which the engine properly idles, has been set to approximately 800 rpm. It is to be noted that feedback control is ordinarily introduced when the engine operates at speeds under the feedback idling engine speed. If the answer to the decision made in step P8 is no, this indicates that the current engine speed is equal to or higher then the desired feedback idling engine speed No, which results from a shift of specific forward gears of the transmission, such as second and third gears. Then, a decision is made in step S9 concerning an ignition timing retard control execution time C. When the ignition timing retard control execution time C has passed, fuel ignition is made at the basic ignition timing IgB, read out in step P3, in step P14. After fuel ignition in step P14, a return is ordered so as to start another ignition timing retarding feedback control sequence.

If the answer to the decision made in step P8 is yes, indicating that the current engine speed is lower then the desired feedback idling engine speed No, or if the answer to the decision in step P9 is yes, indicating that the ignition timing retard control execution time T has not as yet passed, although the current engine speed is lower than the desired feedback idling engine speed No, the ignition timing retarding feedback control for idling is performed in steps P10 to P14.

Figure 5:
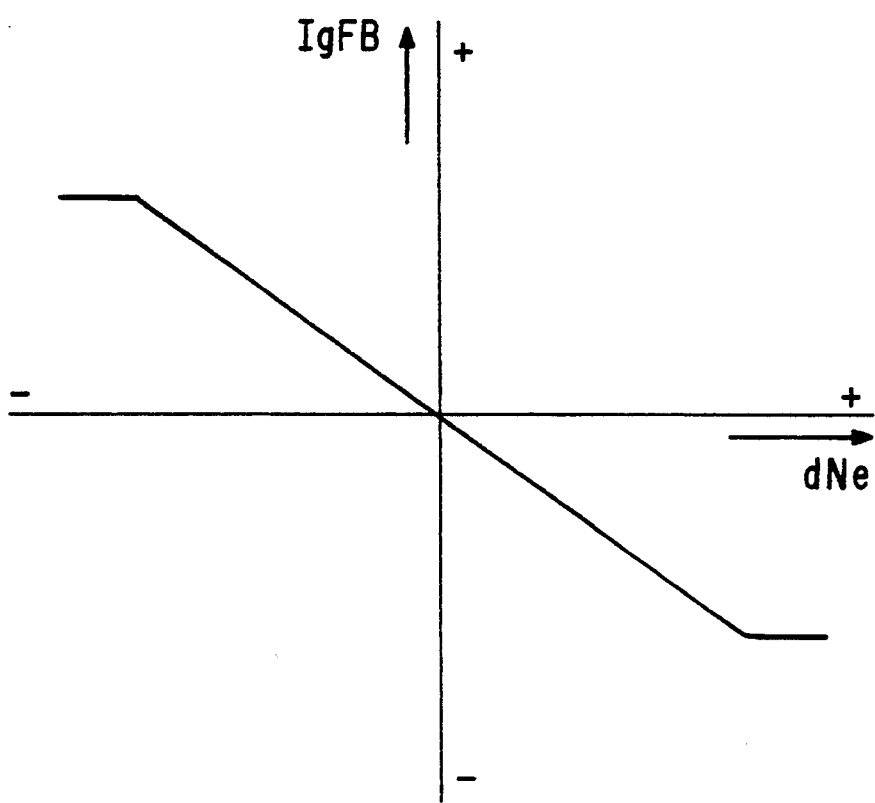
FIG. 5 is a diagram showing a corrective feedback value for ignition timing relative to an engine speed deviation.

In step P10, an idle retardation IgR, by which the basic ignition timing IgB is retarded, is set. Thereafter, an engine speed deviation dNe of the current engine speed Ne from the desired idling engine speed N, for instance 800 rpm, is calculated in step P11. Then, in step P12, a corrective ignition timing IgFB is read out from a map of corrective ignition timing IgFB as it relates to engine speed deviation dNe; such a map is represented in FIG. 5. An eventual ignition timing Ig is calculated by adding the basic ignition timing IgB, the idle retardation IgR and the corrective ignition timing IgFB all together in step P13. Then, fuel ignition is made at an eventual ignition time Ig in step P14 so as to cause the engine speed Ne to converge with the desired idling engine speed N. After fuel ignition in step P14, a return is ordered so as to start another ignition timing retarding feedback control sequence.

The ignition timing retard control execution counter C is set to a predetermined initial count T, for instance 20, in step P7 while the transmission is shifting into a neutral range from in-gear ranges. Consequently, an ignition timing feedback control, which is intended during idling only, is conducted until control execution time T is fully counted down during the shifts of the transmission into a neutral range from forward gear ranges, and especially during shifts from second and a third gears, wherein an engine speed Ne is generally higher than a desired feedback idling engine speed No.

It is to be understood that although the present invention has been described in detail with respect to preferred embodiments thereof, various other embodiments and variants may occur to those skilled in the art. Any such other embodiments and variants which fall within the scope and spirit of the present invention are intended to be covered by the following claims.

What is claimed is:

1. An engine control system for an internal combustion engine associated with a transmission, comprising:
   air flow detecting means for detecting a quantity of intake air introduced into the internal combustion engine;
   speed detecting means for detecting an engine speed at which the internal combustion engine operates;
   shift detecting means for detecting a shift of the transmission into a neutral range; and
   control means for calculating a deviation in said quantity of intake air detected by said air flow detecting means from a predetermined target quantity necessary to hold the internal combustion engine idling at a predetermined idle speed, and for retarding an ignition time, at which ignition is made, when said shift detecting means detects a shift of said transmission into a neutral range during a predetermined period so as to cause said quantity of intake air to converge with said predetermined target quantity, thereby causing an engine speed of the internal combustion engine to converge with said predetermined idle speed.

2. An engine control system as recited in claim 1, wherein said shift detecting means comprises a switch for detecting disengagement of a clutch of said transmission.

3. An engine control system as recited in claim 1, wherein said control means retards said ignition time gradually with passage of time.

4. An engine control system as recited in claim 1, wherein said control means calculates said deviation as a difference between an actual air charging efficiency and a predetermined target air charging efficiency.

5. An engine control system as recited in claim 4, wherein said actual air charging efficiency is calculated based on a quantity of intake air detected by said air flow detecting means and an engine speed detected by said speed detecting means.

6. An engine control system as recited in claim 5, wherein said target air charging efficiency is calculated based on said predetermined target quantity necessary to hold the internal combustion engine idling at said predetermined idle speed.

7. An engine control system for an internal combustion engine associated with a transmission, comprising:
   air flow detecting means for detecting a quantity of intake air introduced into the internal combustion engine;
   speed detecting means for detecting an engine speed at which the internal combustion engine operates;
   shift detecting means for detecting a shift of the transmission into a neutral range; and
   control means for calculating a deviation in an engine speed, detected by said speed detecting means, from a predetermined idle speed at which the internal combustion engine is held during idling, for performing an ignition time retarding feedback control for retarding an ignition time, at which fuel ignition is made, based at least on said deviation in an engine speed, when said shift detecting means detects a shift of said transmission into a neutral range during a predetermined period so as to cause an engine speed of the internal combustion engine to converge with said predetermined idle speed, and for holding said ignition time retarding feedback control for a predetermined period of time when an engine speed is higher than a predetermined feedback control speed.

8. An engine control system as recited in claim 7, wherein said ignition time retarding feedback control is ordinarily performed at engine speeds lower than said predetermined feedback control speed.

9. An engine control system as recited in claim 7, wherein said ignition time retarding feedback control is performed so that it is further based on a deviation of a quantity of intake air, detected by said air flow detecting means, from a predetermined target quantity of intake air necessary to keep the internal combustion engine idling at said predetermined idle speed.

10. An engine control system as recited in claim 9, wherein said shift detecting means comprises a switch for detecting disengagement of a clutch of said transmission.

11. An engine control system as recited in claim 9, wherein said control means retards said ignition time gradually with passage of time.

12. An engine control system as recited in claim 9, wherein said control means calculates said deviation as a difference between an actual air charging efficiency and a predetermined target air charging efficiency.

13. An engine control system as recited in claim 12, wherein said actual air charging efficiency is calculated based on a quantity of intake air detected by said air flow detecting means and an engine speed detected by said speed detecting means.

14. An engine control system as recited in claim 13, wherein said target air charging efficiency is calculated based on said predetermined target quantity of intake air necessary to keep the internal combustion engine idling at said predetermined idle speed.

* * * * *